US008435677B2

(12) United States Patent
Kay

(10) Patent No.: US 8,435,677 B2
(45) Date of Patent: May 7, 2013

(54) LITHIUM METAL PHOSPHATE/CARBON NANOCOMPOSITES AS CATHODE ACTIVE MATERIALS FOR RECHARGEABLE LITHIUM BATTERIES

(75) Inventor: Andreas Kay, Waldkirch (DE)

(73) Assignee: Dow Global Technologies LLC, Midland, MI (US)

( * ) Notice: Subject to any disclaimer, the term of this patent is extended or adjusted under 35 U.S.C. 154(b) by 261 days.

(21) Appl. No.: 13/057,252

(22) PCT Filed: Jul. 29, 2009

(86) PCT No.: PCT/IB2009/053300
§ 371 (c)(1),
(2), (4) Date: Feb. 2, 2011

(87) PCT Pub. No.: WO2010/015959
PCT Pub. Date: Feb. 11, 2010

(65) Prior Publication Data
US 2011/0136014 A1  Jun. 9, 2011

(30) Foreign Application Priority Data
Aug. 5, 2008  (WO) .................. PCT/IB2008/053142

(51) Int. Cl.
*H01M 4/13*   (2010.01)
*H01M 4/58*   (2010.01)
*H01M 10/14*  (2006.01)
*B23P 19/00*  (2006.01)

(52) U.S. Cl.
USPC ............... 429/231.8; 429/231.9; 429/231.95; 429/218.1; 29/730

(58) Field of Classification Search ............... 429/231.8, 429/231.9, 231.95, 218.1; 29/730
See application file for complete search history.

(56) References Cited

U.S. PATENT DOCUMENTS

| | | | | |
|---|---|---|---|---|
| 5,753,387 A | * | 5/1998 | Takami et al. ................. | 429/332 |
| 6,414,837 B1 | * | 7/2002 | Sato et al. ..................... | 361/504 |
| 2008/0207442 A1 | * | 8/2008 | Pfeifer et al. ................. | 502/416 |

FOREIGN PATENT DOCUMENTS

| | | | |
|---|---|---|---|
| CN | 101081696 A | * | 12/2007 |
| CN | 101159328 A | | 4/2008 |
| CN | 101162789 A | | 4/2008 |
| EP | 1195837 B1 | | 5/2008 |
| EP | 2015382 A1 | | 1/2009 |
| WO | 2007113624 A1 | | 10/2007 |
| WO | 2009127901 A1 | | 10/2009 |

OTHER PUBLICATIONS

Torres et al Applied Catalysis A General vol. 161 1997 pp. 213-226.*
Bewlay Thesis Feb. 2006 Univ of Wollongong—[http://ro.uow.edu.au/theses/495/] Wologngon NSW 2522 Australia.*
Rios et al. (Carbon vol. 44 2006 pp. 1448-1454).*
Hong, Liang-shi, et al., "Synthesis of ultra-fine LiFePO4/C and its electrochemical performance", 2006 TMS Fall Extraction and Processing Division: Sohn International Symposium—Sohn International Symposium: Advanced Processing of Metals and Materials—Proceedings of the International Symposium 2006 Minerals, Metals and Materials Society U.S., vol. 3, 2006, pp. 229-238, XP8127542.
Vohler, O., et al., Carbon, Ullman's Encyclopedia of Industrial Chemistry 2002.
Geim, A.K., et al., The rise of graphene, Nature Materials 2007, 6, (3), 183-191.
Solum, M.S., et al., Evolution of Carbon Structure in Chemically Activated Wood, Carbon 1995, 33, (9), 1247-1254.
Jagtoyen, M., et al., Activated carbons from yellow poplar and white oak by $H_3PO_4$ activation, Carbon 1998, 36, (7-8), 1085-1097.
Jagtoyen, M., et al., Some Considerations of the Origins of Porosity in Carbons from Chemically Activated Wood, Carbon 1993, 31, (7), 1185-1192.
Puziy, A., et al., Oxygen and phosphorus enriched carbons from lignocellulosic material, Carbon 2007, 45, (10), 1941-1950.
Puziy, A., et al., Surface chemistry of phosphorus-containing carbons of lignocellulosic origin, Carbon 2005, 43, (14), 2857-2868.
Brown, E., et al., Vapor pressure of Phosphoric Acids, Industrial and Engineering Chemistry, 1952, 44, (3), 615-618.
Thilo, E., et al., Zur Chemie Der Kondensierten Phosphate Und Arsenate, 17. Der Verlauf und Die Produkte Der Entwasserung Der Monophosphorsaure $H_3PO_4$, Journal Fur Praktische Chemie 1957, 4, (5-6), 324-348.
Bourbigot, S., et al., Carbonization Mechanisms Resulting from Intumescence 2. Association with an ethylene terpolymer and the ammonium polyphosphate pentaerythritol fire-retardant system, Carbon, 1995, 33 (3), 283-294.
McKee, D., et al., The inhibition of graphite oxidation by phosphorus additives, Carbon, 22, 33, 285-290, 1984.
Hu, X., et al., Journal of the Electrochemical Society 154 (11) A1026-A1030 2007, A (LiFePO4-AC $Li_4Ti_5O_{12}$) Hybrid Battery Capacitor.

* cited by examiner

*Primary Examiner* — Patrick Ryan
*Assistant Examiner* — Aaron Greso

(57) ABSTRACT

A process for the synthesis of lithium metal phosphate/carbon nanocomposites as cathode active materials in rechargeable electrochemical cells comprising mixing and reacting precursors of lithium, transition metal(s) and phosphate with high surface area activated carbon, preferably phosphorylated carbon.

9 Claims, No Drawings

LITHIUM METAL PHOSPHATE/CARBON NANOCOMPOSITES AS CATHODE ACTIVE MATERIALS FOR RECHARGEABLE LITHIUM BATTERIES

FIELD OF THE INVENTION

The invention relates to lithium metal phosphate/carbon nanocomposites as cathode active materials in rechargeable electrochemical cells.

STATE OF THE ART

Lithium transition metal phosphate/carbon nanocomposites, especially LiFePO$_4$/C and Li$_x$Mn$_y$Fe$_{1-y}$PO$_4$/C as cathode active materials in rechargeable lithium-ion batteries have been shown to yield excellent charge capacity even at high charge/discharge rates. As previously disclosed by us[1] such lithium metal phosphate/carbon nanocomposites can be obtained by milling of suitable precursors of lithium, transition metals and phosphate with high surface area carbon black or with graphite followed by crystallization at relatively low temperature (400° C. to 600° C.). Milling results in braking of the graphene planes and creation of highly reactive coordinatively unsaturated carbon atoms (dangling bonds) at the graphene edges, which can form covalent bonds with phosphate groups or via oxygen with the transition metal centres. The thus obtained nanoscale mixture of lithium metal phosphate precursors crystallizes already at relatively low temperature, which in combination with the covalently bound carbon prevents crystal growth and results in a nanocomposite of lithium metal phosphate nanoparticles and carbon. The small particle size of the lithium metal phosphate and the intimate contact with electrically conducting carbon allows good electrochemical performance even with nearly insulating materials such as Li$_x$Mn$_y$Fe$_{1-y}$PO$_4$.

Lithium metal phosphate/carbon nanocomposites of small enough primary size (in the order of 50 nm) can be obtained with high surface area carbon blacks that easily brake during milling and provide a large number of active sites for reaction with the precursors of the lithium metal phosphate. However, such high surface area carbon blacks are expensive and energy intensive to produce, usually by pyrolysis of petroleum derivates at temperatures far above 1000° C.[2]

Lithium metal phosphate/carbon nanocomposites can also be synthesised with graphite, which is first exfoliated into graphene multisheets by sheer forces during milling, and then further broken into smaller nanographene sheets with active sites at the edges.

While synthetic graphites are somewhat cheaper than high surface area carbon blacks their production by graphitization of carbon at high temperature (above 2500° C.) is even more energy intensive.[2] Moreover, graphites require longer or more energetic milling than high surface area carbon blacks to reduce them to nanoscale size. The milling time can be reduced by employing high surface area graphite, which can for example be obtained by rapid thermal expansion of acid intercalated graphite.[3] However, such additional production steps again increase the manufacturing costs.

DESCRIPTION OF THE INVENTION

The present invention concerns the synthesis of lithium metal phosphate/carbon nanocomposites employing activated carbon. Preferably the synthesis employs high surface area phosphorylated carbon, i.e. carbon with covalently bound phosphate groups, obtained by phosphoric acid activation of carbonaceous vegetable materials, preferably cellulosic or lignocellulosic materials, such as wood or agricultural residues. This process has the advantage of using cheap, renewable carbon resources and significantly less energy, due to the much lower process temperatures required for carbon activation as compared to that needed for the fabrication of high surface area carbon black or graphite. Furthermore, the subsequent reaction with lithium and transition metal precursors to form the desired lithium metal phosphate/carbon nanocomposite is considerably facilitated, since a high surface area carbon with covalently bound phosphate groups is already obtained by phosphoric acid activation of the hollow fibrous or cellular structure of the vegetable material. This reduces or even eliminates the time and energy demand for mechanical activation by milling.

The synthesis of lithium metal phosphate/carbon nanocomposites according to the present invention comprises the following steps:

a) impregnating a cellulosic precursor with an activating agent comprising phosphoric acid or a phosphate salt or a phosphate ester, b) heating the impregnated cellulosic precursor to a temperature from about 450° C. to about 800° C. to produce a phosphorylated carbon of high specific surface area, c) mixing the thus obtained phosphorylated carbon with precursors of lithium, transition metals, optional dopants and, if required, additional phosphate, d) heating the mixture of step c) at a temperature from about 450° C. to about 800° C. to produce a nanocomposite of lithium metal phosphate and carbon.

Suitable cellulosic precursors are vegetable materials such as wood (e.g. hardwood, softwood, woodchips, wood flour, sawdust), agricultural residues like straw, nut shells (e.g. coconut, almond or palm nut shells), nut pits, fruit stones (e.g. olive, cherry or peach stones), cotton, linen, jute, bark, cork, cellulose pulp, paper etc. Materials that yield an activated carbon of low mechanical strength are preferred, because this facilitates the subsequent formation of a nanocomposite with lithium metal phosphate. Such materials are typically characterized by low gravimetric density and low lignin binder content, e.g. cellulose pulp, paper or cotton. Preferably the material has low ash content. If required the ash content of the cellulosic precursor can be reduced e.g. by leaching with acid. Preferably the cellulosic precursor is dried and reduced in particle size by crushing, grinding, milling etc.

In step a) of the process the cellulosic precursor is impregnated with a solution of phosphoric acid or a phosphate salt or a phosphate ester, preferably with orthophosphoric acid H$_3$PO$_4$. Suitable impregnation ratios, defined as the weight ratio of phosphoric acid or phosphate to cellulosic precursor (dry basis) are in the range from about 0.1 to about 5.0. The preferred impregnation ratio is in the range from about 0.5 to about 1.5. Optionally a graphitization catalyst, such as iron compounds can be added, in order to improve the electrical conductivity of the final product.

In step b) of the process the thus impregnated cellulosic precursor is heated first to dry it, and then further to from covalent carbon-phosphate bonds (phosphorylation), dehydrate the precursor and finally form an electrically conducting, phosphorylated carbon of high specific surface area.

It has been reported[4-8] that phosphoric acid reacts already below 150° C. with cellulose under formation of phosphate esters. Crosslinking by phosphate and polyphosphate species reduces the liberation of volatiles at higher temperatures and thereby improves the carbon yield. Dilation of the precursor structure from around 250° C. to 450° C. results in a micro- and mesoporous, phosphorylated carbon of high specific surface area (typically above 1000 m$^2$/g). Beyond 450° C. the phosphate ester bonds become unstable and phosphate is slowly lost by evaporation.[9, 10] The aromatic cluster size and thus the electric conductivity of the carbon increases rapidly above 450° C.

According to the present invention the impregnated cellulosic precursor is heated to a temperature in the range from about 450° C. to about 1000° C., preferably from 450° C. to 800° C., and more preferably from 450° C. to 600° C. The heating rate should either be low enough to allow escape of volatiles (mainly water) without blowing up the material or high enough to loosen its structure by foaming. The heat treatment above 450° C. should be minimized in time in order to enhance the electric conductivity of the carbon by partial graphitization without extensive phosphate loss by evaporation.

The heat treatment can be carried out in air, since the phosphate ester groups protect the carbon to some extent from oxidation.[11, 12] Nevertheless heat treatment above 450° C. is preferably done in inert gas atmosphere, such as nitrogen or argon. The gas pressure can be increased in order to reduce the loss of phosphate by evaporation. The pores of the thus obtained high surface area carbon are at least partially filled with polyphosphoric acid, which in contrast to the fabrication of adsorbents from phosphoric acid activated carbons needs not to be extracted with water, since it serves as precursor in the further reaction to lithium metal phosphate.

In step c) of the process the high surface area phosphorylated carbon from step b) is mixed with precursors of lithium, one or more transition metals, optional dopants and, if necessary, additional phosphate in appropriate quantities for the synthesis of the desired lithium metal phosphate/carbon nanocomposite. The final carbon content of the lithium metal phosphate/carbon nanocomposite is preferably in the range from about 1% to about 20%, and more preferably from 1% to 10%.

Preferred precursors of lithium are $Li_2CO_3$, $Li_2O$, LiOH, $LiH_2PO_4$, $Li_2HPO_4$, $Li_3PO_4$, lithium metaphosphate or polyphosphate.

Preferred transition metals precursors are metal carbonates or oxalates or oxides, hydroxides, salts with carboxylic acids (e.g. acetates) or hydroxyl carboxylic acids (e.g. glycolates, lactates, citrates, tartrates), chlorides, sulphates or nitrates.

Preferred precursors of phosphate are $H_3PO_4$, $HPO_3$, $P_2O_5$, $LiH_2PO_4$, $Li_2HPO_4$, $Li_3PO_4$, lithium metaphosphate or polyphosphate, $NH_4H_2PO_4$, $(NH_4)_2HPO_4$.

In a preferred embodiment mixing is carried out in the dry state. A preferred method for dry mixing is milling, and more preferably ball milling. In the case of dry mixing the precursors should be selected so that any by-products of the reaction are volatile, e.g. $H_2O$, $CO_2$, $NH_3$, $NO_2$.

In another preferred embodiment mixing is carried out in a liquid phase. More preferably mixing is done in aqueous phase. The precursors are preferably mixed stepwise, e.g. first phosphorylated carbon is mixed with transition metal precursors and additional phosphoric acid or phosphate, followed by neutralization with the required amount of LiOH solution or $Li_2CO_3$. Undesired by-products of the reaction can be removed from the solid product by washing, e.g. Cl$^-$, $HCO_3-$, $SO_42-$, $NO_3-$, $NH_4+$ etc.

Mixing can be carried out in air, or if required, under inert gas or reducing atmosphere, in order to prevent oxidation, e.g. of $Fe^{2+}$. The reaction rate during mixing may be enhanced by heating.

In step d) of the process the mixture of step c) is heated for crystallization to a temperature from about 400° C. to about 800° C. This temperature influences the crystallite size of the lithium metal phosphate/carbon nanocomposite and therefore its electrochemical performance. Preferably the temperature is in the range from about 450° C. to about 600° C. Preferably this heat treatment is done under inert gas atmosphere, such as nitrogen or argon, in order to avoid oxidation by air. If necessary a reactive atmosphere, e.g. a reducing atmosphere containing $H_2$, $CO/CO_2$ or $H_2O/CO_2$ can be used.

EXAMPLE 1

Synthesis of a $LiMn_{0.8}Fe_{0.2}PO_4$/C Nanocomposite

Cellulose powder (2 g) was impregnated with a solution of 85% $H_3PO_4$ (2 g) and water (4 g) and heated in air from ambient temperature to 470° C. within 1 hour. The phosphorus content of the obtained activated carbon was determined after digestion of a sample with sulphuric/nitric acid by the phosphomolybdenum blue method to 9.1 mmol P/g.

Phosphorylated carbon (1.43 g), $MnCO_3$ (2.76 g), Fe(II) oxalate dihydrate (1.08 g), $LiH_2PO_4$ (1.77 g) and $Li_2CO_3$ (0.48 g) were milled in a hardened steel container with hardened steel balls for 2 hours at 500 rpm in a planetary ball mill (Retsch PM 100). The obtained powder was heated up to 470° C. within 30 minutes and maintained at this temperature for 1 hour under a stream of argon. The carbon content of the resulting $LiMn_{0.8}Fe_{0.2}PO_4$/C nanocomposite was 8% by weight.

References

1. Kay, A.; High Power Lithium, S. A., Lithium Metal Phosphate/Carbon Nanocomposites as Cathode Active Materials for Secondary Lithium Batteries. Patent Application 2008, PCT/IB2008/051418.
2. Vohler, O.; et al., Carbon. *Ullman's Encyclopedia of Industrial Chemistry* 2002.
3. Geim, A. K.; Novoselov, K. S., The rise of graphene. *Nature Materials* 2007, 6, (3), 183-191.
4. Solum, M. S.; Pugmire, R. J.; Jagtoyen, M.; Derbyshire, F., Evolution of Carbon Structure in Chemically Activated Wood. *Carbon* 1995, 33, (9), 1247-1254.
5. Jagtoyen, M.; Derbyshire, F., Activated carbons from yellow poplar and white oak by H3PO4 activation. *Carbon* 1998, 36, (7-8), 1085-1097.
6. Jagtoyen, M.; Derbyshire, F., Some Considerations of the Origins of Porosity in Carbons from Chemically Activated Wood. *Carbon* 1993, 31, (7), 1185-1192.
7. Puziy, A. M.; Poddubnaya, O. I.; Martinez-Alonso, A.; Castro-Muniz, A.; Suarez-Garcia, F.; Tascon, J. M. D., Oxygen and phosphorus enriched carbons from lignocellulosic material. *Carbon* 2007, 45, (10), 1941-1950.
8. Puziy, A. M.; Poddubnaya, O. I.; Martinez-Alonso, A.; Suarez-Garcia, F.; Tascon, J. M. D., Surface chemistry of phosphorus-containing carbons of lignocellulosic origin. *Carbon* 2005, 43, (14), 2857-2868.
9. Brown, E. H.; Whitt, C. D., Vapor Pressure of Phosphoric Acids. *Industrial and Engineering Chemistry* 1952, 44, (3), 615-618.
10. Thilo, E.; Sauer, R., Zur Chemie Der Kondensierten Phosphate Und Arsenate .17. Der Verlauf Und Die Produkte Der Entwässerung Der Monophosphorsäure H3PO4. *Journal Für Praktische Chemie* 1957, 4, (5-6), 324-348.
11. Bourbigot, S.; Lebras, M.; Delobel, R.; Breant, P.; Tremillon, J. M., Carbonization Mechanisms Resulting from Intumescence .2. Association with an Ethylene Terpolymer and the Ammonium Polyphosphate Pentaerythritol Fire-Retardant System. *Carbon* 1995, 33, (3), 283-294.

12. McKee, D. W.; Spiro, C. L.; Lamby, E. J., The Inhibition of Graphite Oxidation by Phosphorus Additives. *Carbon* 1984, 22, (3), 285-290.

The invention claimed is:

1. A process for the synthesis of lithium metal phosphate/carbon nanocomposites for use as cathode active materials in rechargeable electrochemical cells comprising:
   a) impregnating a cellulosic precursor with an activating agent comprising phosphoric acid or a phosphate salt or a phosphate ester,
   b) heating the impregnated cellulosic precursor to produce a phosphorylated carbon from about 450° C. to about 600° C.,
   c) mixing the phosphorylated carbon with precursor compounds of lithium and transition metals and optionally dopants and compounds containing phosphate that are not precursor compounds of lithium and transition metals, and
   d) heating the mixture of step c) to produce a nanocomposite of lithium metal phosphate and carbon, wherein at least a portion of the phosphorous for the lithium metal phosphate of the lithium metal phosphate/C composite is of phosphorylated carbon serving as a reaction precursor.

2. The process of claim 1, wherein the cellulosic precursor is a material selected from the group consisting of hardwood, softwood, woodchips, wood flour, sawdust, straw, nut shells, nut pits, fruit stones, cotton, linen, jute, bark, cork, cellulose pulp, paper, and a mixture or mixtures thereof.

3. The process of claim 1, wherein the cellulosic precursor is selected from the group consisting of cellulose pulp, paper, cotton, or a mixture thereof.

4. The process of claim 1, wherein the cellulosic precursor is impregnated with a solution of phosphoric acid or a phosphate salt or a phosphate ester, in a weight ratio of phosphate or phosphoric acid to cellulosic precursor on a dry basis that is from about 0.1 to 5.0.

5. The process of claim 1, wherein a graphitization catalyst is added in step a).

6. The process of claim 1, wherein the impregnated cellulosic precursor of step a) is heated to a temperature in the range from about 450° C. to about 600° C.

7. The process of claim 1, wherein the heating rate is high enough in step b) to cause foaming of the mixture.

8. The process of claim 1, wherein the additional optional compounds containing phosphate are $H_3PO_4$, $HPO_3$, $P_2O_5$, $LiH_2PO_4$, $Li_2HPO_4$, $Li_3PO_4$, lithium metaphosphate or polyphosphate, $NH_4H_2PO_4$, and $(NH4)_2HPO_4$, or combinations thereof.

9. The process of claim 1, wherein there are no optional compounds containing phosphate.

* * * * *